United States Patent Office 2,742,016
Patented Apr. 17, 1956

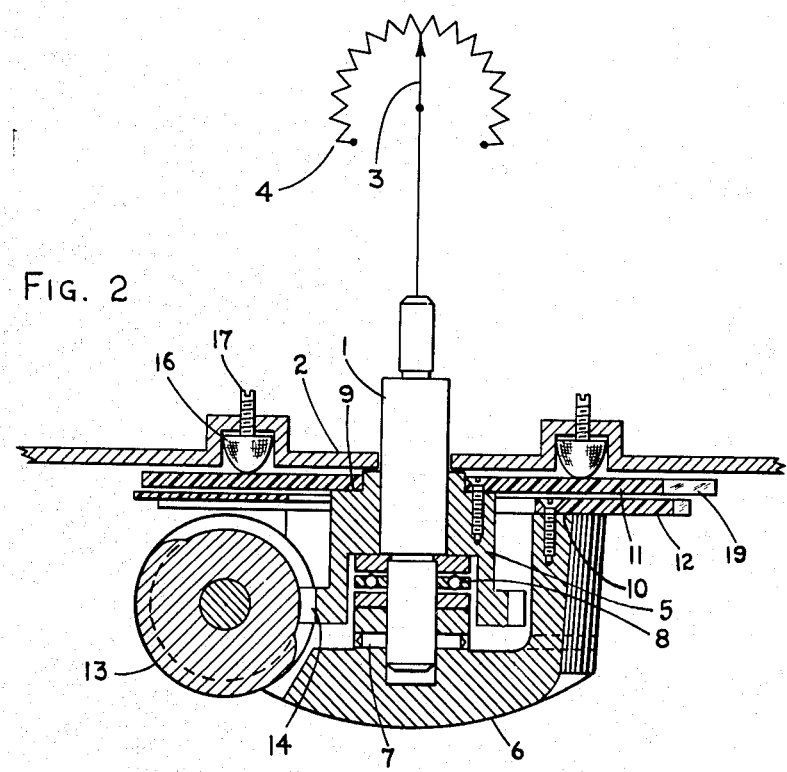
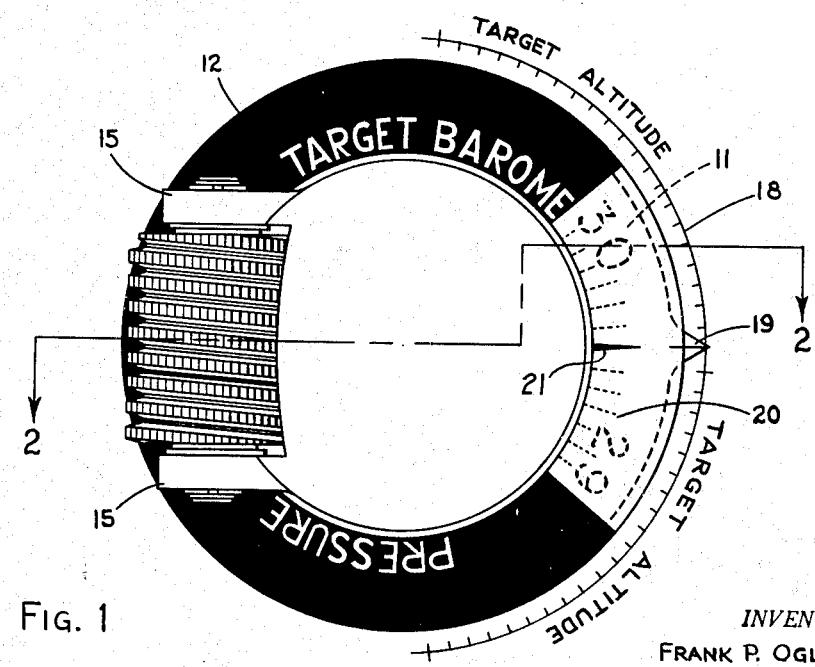

2,742,016

DUAL DIALS

Frank P. Oglesby, Jr., Beach Grove, Ind., assignor to the United States of America as represented by the Secretary of the Navy Application June 11, 1953, Serial No. 361,098

3 Claims. (Cl. 116—124)

(Granted under Title 35, U. S. Code (1952), sec. 266)

The invention described herein may be manufactured and used by or for the Government of the United States of America for governmental purposes without the payment of any royalties thereon or therefor.

My invention relates to dials and is particularly directed to dial structures into which a plurality of factors may be manually fed.

It is often desirable in front-panel manipulation of dials and controls to feed two, or more, factors into one shaft rotation. The algebraic addition of two or more quantities, such as voltages, usually involves complex circuitry, and where the quantities are manually controlled by an operator, dials for each quantity are mounted on the front panel and are separately mechanically coupled into the circuitry. In the case of cockpit controls, the confusion of dials has become intolerable. In fighter aircraft, for example, the speed of setting gunnery factors into a lead angle computer may determine the success or failure of the craft's mission. Typically, target altitude in feet and barometric pressure in inches of mercury must be fed to the computer for each "pass" at the target.

An object of this invention is to provide a dial structure for setting two or more factors into a single shaft.

Another object of this invention is to provide an improved multiple input dial for single-shaft drives.

Other objects will become apparent as the description of one preferred embodiment proceeds hereinafter. The invention is defined with particularity in the appended claims and is shown in the accompanying drawing in which:

Fig. 1 is a front elevation view of my improved dial structure, and

Fig. 2 is a sectional view along line 2—2 of Fig. 1.

The dial structure shown in Figures 1 and 2 for setting two factors into the single shaft comprises two dials concentrically mounted on one end of said shaft, one dial being keyed to the shaft and the other dial being rotatable independently of said shaft. Means adjustably interlock the dials so that positive relative motion may be imparted to the two dials and so that motion will be transmitted from one dial through the other dial to the shaft. A brake means is carried on the panel and frictionally engages the rotationally free dial, the drag of the brake means being greater than the load on or resistance to rotation of said shaft. Indicia or scale marks are provided on the panel to measure rotational position of one dial, and indicia are placed on the other dial to measure the relative rotational positions of the two dials.

The shaft 1 to be rotated in accordance with two independent factors is journaled in the panel 2 with its rear end coupled into mechanical or electrical equipment to be controlled. The load placed on the shaft, for example, may comprise the wiper 3 of the potentiometer 4 as shown. Upon the forward end of the shaft is placed two concentric superimposed dials 5 and 6, one dial being keyed to the shaft. In the preferred embodiment the outer dial 6 is keyed as by a pin 7 extending through registering holes in the shaft and the hub portion of the outer dial. The inner dial 5 floats free on the shaft and is frictionally insulated from the first dial as by a roller bearing 8. The rims 9 and 10 of the dials are extended radially outward by means of integrally or separately attached flanges 11 and 12. Conveniently, the flanges are separately molded flat rings of transparent thermoplastic and are screwed along their inner peripheries to their respective dials.

According to my invention the two dials are adjustably interlocked, a particularly convenient adjustable interlock being the worm 13 carried on the outer dial and the toothed pinion 14 carried on or formed out of the material of the inner dial. Parallel lugs 15 on the outer dial carry a short shaft extending axially through the worm body, the threads of which are knurled for easy engagement with the operator's fingers. The worm threads enmesh with the teeth of the pinion, machined surfaces being preferred for close fitting and minimum backlash.

The dials may be molded of commercially obtainable thermoplastic or may be cast and machined from aluminum or the lighter grades of pot metal.

Since the outer dial is the one chosen in this embodiment to be keyed to the shaft, a drag must be placed on the inner dial with braking force in excess of the maximum torque load that may be placed on the shaft. Conveniently, one or more felt pads 16 mounted on adjusting screws 17 in the panel, drags on the underside of the flange 11. Manipulation of the worm will thus transmit to the shaft 1 a rotation proportional to the relative displacement of the two dials which rotation will add algebraically to any rotation of the shaft caused by the inner dial. Indicia or scale marks 18 are inscribed on the panel and are swept by the pointer 19 on the inner dial to measure shaft displacement in terms of the units and calibration of the scale marks. Likewise, scale marks 20 inscribed on the inner dial, or more conveniently, on the flange 11 of the inner dial and swept by the pointer 21 on the outer dial measures shaft displacement in terms of the units and calibration of the scale marks 20. It follows that total shaft rotation is the algebraic sum of the scale marks traversed by the two pointers 19 and 21.

Excellent results have been obtained in using my improved dial for adding target altitude in feet to target barometric pressure in inches, scales for these two quantities being appropriately laid out along the periphery of the dials. Preferably, the upper flange 12 is of transparent plastic material, with all but a segment of 60 or 70 degrees covered with an opaque coating leaving a window through which the scale on the lower flange 11 may be read. The pointer 21 may then comprise a single line or mark inscribed on the window segment at or near the center of the window.

By interlocking the two dials and by placing a drag on the dials, according to my invention, the quantities fed to the dials cannot be disturbed by vibration of the panel or dials. Superimposition of the two dials in one structure conserves space on the panel and minimizes errors due to confusion among the dials. My improved dual dial is of particular importance in fighter aircraft where speed of setting factors into a lead angle computer is so important yet where the dial setting must share the attention of the pilot with numerous other controls. My improved dial is rugged in construction, easy to adjust, is easy to read and is reliable in operation.

What is claimed is:

1. In combination in a dial structure for setting in two factors into a single shaft comprising a shaft, two dials concentrically mounted on one end of said shaft, one dial being keyed to said shaft, and the other dial being rotatable independently of said shaft, a worm and a gear, the worm being enmeshed with said gear, the worm and gear being secured, respectively, to said two dials, and a stationary friction drag on said other dial.

2. In combination in a dial structure, a shaft, a mounting panel, one end of said shaft extending through said panel, a first and a second dial, the dials being concentrically disposed over said end of the shaft, one of said dials being keyed to said shaft and the other dial being freely rotatable on said shaft, a brake means carried by said panel and frictionally engaging said other dial, the drag of said brake means being greater than the resistance to rotation of said shaft, means adjustably interlocking said dials, and indicia on said panel to measure the rotational position of said other dial, and indicia on said other dial to measure the rotational position of said one dial.

3. A mechanical computer for setting the algebraic sum of two factors into one shaft, comprising a first drive means keyed to said shaft, a second drive means pivotly mounted and freely rotatable on said shaft, means adjustably interlocking said first and second drive means, means to measure the relative displacements of said drive means one with respect to the other, drag means frictionally engaging said second drive means, and means to measure the absolute displacement of said second drive means.

References Cited in the file of this patent

UNITED STATES PATENTS

| | | |
|---|---|---|
| 1,536,039 | Bradley | Apr. 28, 1925 |
| 1,577,714 | Hayden | Mar. 23, 1926 |